United States Patent [19]

Murtin

[11] 4,127,029
[45] Nov. 28, 1978

[54] IONIC MEASURING DEVICE

[75] Inventor: Fernand R. C. Murtin, Paris, France

[73] Assignee: La General de Fluides Geflu, Paris, France

[21] Appl. No.: 790,560

[22] Filed: Apr. 25, 1977

[51] Int. Cl.² ............................................. G01F 1/56
[52] U.S. Cl. ............................................... 73/194 F
[58] Field of Search ........................ 73/194 F; 324/33

[56] References Cited

U.S. PATENT DOCUMENTS

| 3,324,729 | 6/1967 | Vanderslice | 324/33 X |
| 3,996,795 | 12/1976 | Servassier | 73/194 F |
| 4,019,383 | 4/1977 | Wiegand, Jr. et al. | 73/194 F |

Primary Examiner—Charles A. Ruehl
Attorney, Agent, or Firm—Morgan, Finnegan, Pine, Foley & Lee

[57] ABSTRACT

A device for measuring the mass flow or speed of a gas in a pipe comprising a first annular insulating member which supports an ionic source electrode, a second annular insulating member spaced from the first element in the flow direction, the second member supporting "transparent" and collecting electrodes which are insulated from each other and from the source electrode, and a grounded conducting guard ring located between the first and second members which prevents surface currents from flowing between the first and second members.

47 Claims, 6 Drawing Figures

IONIC MEASURING DEVICE

BACKGROUND AND BRIEF DESCRIPTION OF THE INVENTION

The present invention concerns an ionic measuring device for the measurement of mass flow or the speed of gaseous flow.

The Jean Louis Zizine U.S. patent application Ser. No. 634,631 now U.S. Pat. No. 4,056,003, discloses an ionic measuring device of the abovementioned type carrying inside a tubular pipe, at least three conducting grids which are parallel to each other and perpendicular to the pipe axis. In this type of measuring device, measurement errors due to polluting elements in the gaseous flow may be eliminated by drawing the electrodes closer together. Ions thus emitted by the ionic source do not statistically have the time to combine with the polluting elements or the water vapor. However, in this type of measuring device, errors due to surface currents flowing along the inner and outer surfaces of the tube supporting the grids of the measuring device are only eliminated with great difficulty. Furthermore, it is a relatively long and difficult procedure to place the grids in the tube of the measuring device.

One object of the present invention is an ionic measuring device similar to the one described above but which is capable of eliminating all surface current between the grids composing the measuring device.

Another object of the present invention is an ionic measuring device wherein the different electrodes form each a rigid unit easy to mount.

Another object of the present invention is an ionic measuring device the components of which are easy to manufacture and to assemble together.

Still another object of the present invention is an ionic measuring device the electric properties of which are not substantially impaired by water particles mixed within the gaseous flow.

Still another object of present invention is a ionic measuring device easy to connect to the corresponding gas ducts.

Still another object of present invention is to provide a measuring device the body elements of which may be manufactured by simple moulding and the mounting of which together with the electrodes automatically defines the inter-electrode spacings.

According to present invention, an ionic measuring device comprises: at least three conductive electrodes placed along the flow of the gaseous flow the mass flow or speed of which is to be measured, these electrodes being arranged substantially perpendicularly to said gaseous flow and dielectrically insulated from each other, the first electrode being the ionic source electrode, the second one being a "transparent" electrode, and the third one being a collecting electrode; at least two adjoining pipe elements, the first one carrying said ionic source electrode, the second one carrying the two other said electrodes; an electrically conductive guard ring arranged between said two pipe elements to stop both inner and outer surface currents between said two pipe elements.

Preferably, one of said pipe elements comprises a portion thereof with reduced outer diameter engaging within an adjacent portion of the other pipe element, said guard ring comprising a first part thereof extending axially between the facing peripheral surfaces of said pipe element portions, and said guard ring comprising a second part thereof extending radially outwardly between facing front parts of said pipe elements.

According to a preferred embodiment of the invention, the measuring device is bi-directionnal and is symmetrical with respect to a plane perpendicular to its longitudinal axis and passing in the middle of the ionic source. This measuring device comprises a single ionic source electrode, two "transparent" electrodes and two collecting electrodes. The measuring circuit connected to these different electrodes may be any one of those disclosed in U.S. Pat. No. 4,056,003 which are incorporated herein by reference.

BRIEF DESCRIPTION OF THE DRAWINGS

These and other objects and advantages of the present ionic measuring device will become apparent after considering the following detailed specification in conjunction with the accompanying drawings, wherein.

DETAILED DESCRIPTION

Figure 1:
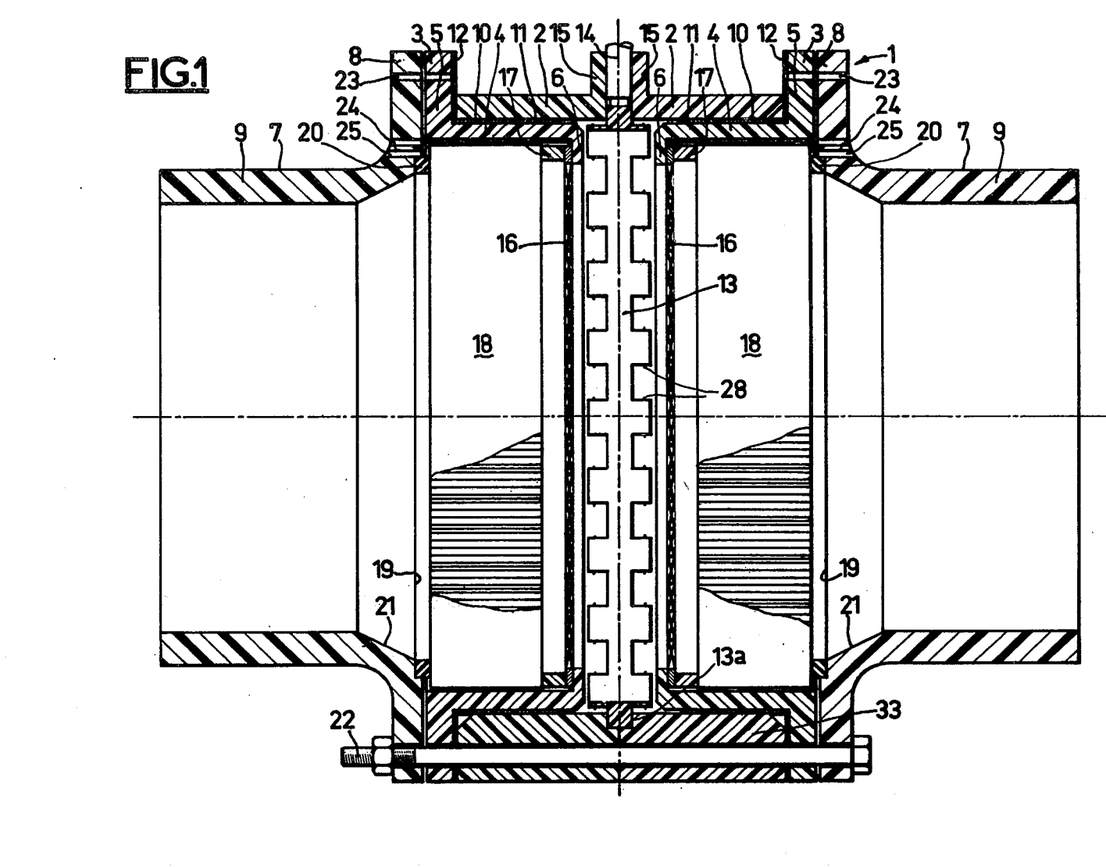
FIG. 1 is a longitudinal cross section of an ionic measuring device according to the present invention.

The measuring device represented in FIG. 1 is symmetrical with respect to a plane the trace P of which has been drawn in FIG. 1, this plane being perpendicular to the longitudinal axis of the measuring device. The body 1 of the measuring device is tubular-shaped and comprises several ring elements made out of insulating material with a low thermal coefficient of expansion and preferably hydrophobic such as a polyamid resin preferably reinforced with glass fibers with a proportion of glass fibers comprised between 5 and 50%.

The body 1 of the device comprises, starting from its plane of symmetry on each side of said plane, a first ring 2 of generally tubular form, a second ring 3 with a tubular part 4 whose outside diameter is slightly smaller than the inside diameter of ring 2 and whose length is slightly shorter than the length of ring 2. Ring 3 has a second part 5 in the form of a flange extending radially towards the outside of said first part 4, on the side of this first part which is farthest away from the plane of symmetry, and a third part 6 extending radially towards the inside on the other side of the said first part 4. The radial length of the third part 6 is smaller than the radial length of the said second part 5, and this radial length of part 6 is only several millimeters.

The body 1 of the measuring device comprises lastly, on each side of said plane, a third ring 7 which consists of a first part 8 in the form of a flange and extending radially, the outside diameter of part 8 being substantially equal to that of part 5 of ring 3. Ring 7 comprises a second annular part 9 extending longitudinally and whose outside diameter is preferably smaller than that of part 4 of ring 3. The wall thickness of part 9 is substantially equal to that of part 8. Part 9 comprises a connecting sleeve onto which the flow input and output gas ducts may be connected. However in place of using rings 7, rings 3 could be manufactured integrally with a connecting sleeve, provided that the inner diameter of such a sleeve at least equals the inner diameter of part 4.

Thus, it can be understood why the outside diameter of part 9 of ring 7 must correspond to the inside diameter of the duct connected onto ring 7. Since it is preferable that the cross section of gaseous flow be substantially equal to the usable cross-section of the electrodes placed inside the probe body, the diameter of the inside of part 9 of rings 7 is preferably substantially equal to the inside diameter of part 4 of ring 3 in which are placed the electrodes of the measuring device as described above.

Between ring 2 and ring 3 is arranged an electrically conductive metallic guard ring 10 comprising two parts: a first annular part 11 extending axially and whose thickness is substantially equal to the difference between the inside diameter of ring 2 and the outside diameter of part 4 of ring 3 and whose length is slightly shorter than the length of part 4 of ring 3 when taken axially. The guard ring 10 comprises a second part 12 which extends radially outwardly, the outside diameter of said part 12 being substantially equal to the outside diameter of part 5 of ring 3. Preferably the thickness of part 12 of guard ring 10 is equal to the thickness of its part 11.

On the inside of the body 1 of the measuring device, and in the middle, is arranged a first electrode or source electrode 13 which is substantially symmetrical with respect to said plane of symmetry of the device. The conformation of electrode 13 will be explained in detail herebelow with reference to FIG. 2. The annular supporting frame of this electrode 13 has an outside diameter which is substantially equal to that of counterbores 13a formed in facing front sides of rings 2, the depth of each said counterbore being substantially equal to half-thickness of said annular supporting frame. However, electrode 13 may be fixed in any other known way inside rings 2. The overall thickness of electrode 13 is slightly smaller than the distance separating the two facing sides of parts 6 of rings 3 so that direct contact is never made between electrode 13 or ring 2 and ring 3. The electrical connection conductor 14 of electrode 13 extends radially from this electrode, the axis of the conductor 14 being substantially in the said plane of symmetry of the measuring device. Conductor 14 extends from the device body through a short sleeve whose inside diameter is adapted to the outside diameter of said conductor, the sleeve being formed by two half-shells 15 which are part of each ring 2.

Inside each ring 3 against the inside surface of part 6, there is first of all an electrode 16 which will be described herebelow with reference to FIG. 3. The outside diameter of electrode 16 is substantially equal to the inside diameter of part 4 of ring 3. Then, against electrode 16 is placed a ring 17 made of electrically insulating material and whose outside diameter is approximately equal to that of electrode 16 and whose radial thickness is about a few millimeters wide, in order not to mask the usable surface of electrode 16. The thickness taken longitudinally of ring 17 is also a few millimeters wide. Then, against ring 17, is placed an electrode 18 which will be described further on in detail with reference to FIG. 4. The outside diameter of the electrode 18 is substantially equal to that of electrode 16 but its thickness is much greater than that of electrode 16.

When electrode 16, ring 17, and electrode 18 are put into place inside ring 3, the thickness of the unit taken axially is equal to or slightly smaller than the inside depth of ring 3 so that the outside surface of electrode 18, that is the surface which is not in contact with ring 17, is flush with or is slightly this side of the joint plane of rings 3 and 7, part 6 of ring 3 serving as stop means for said elements 16, 17, 18.

The side of part 8 of ring 7 facing ring 3 carries a circular counterbore 19 which is concentric to the axis of the measuring device and 1 or 2 millimeters deep, and whose outside diameter is substantially equal to the inside diameter of part 4 of ring 3. Into this counterbore 19 is placed a tightness ring joint 20 whose outside diameter is substantially equal to the outside diameter of the counterbore and whose cross section is substantially square. This joint 20 is meant to maintain elements 16, 17, and 18 in place inside the measuring device and to ensure tightness between rings 3 and 7.

In the case of the measuring device represented in FIG. 1, the inside diameter of part 9 of ring 7 is smaller than the inside diameter of part 4 of ring 3. However, the inside diameter of said part 9 could be substantially the same as that of ring 7. Furthermore, the inside of ring 7 is made in such a way that the inside diameter of part 9, which is constant for most of its length, increases on the part facing ring 3 in order to obtain on the side of ring 7 facing ring 3 an inside diameter which is slightly smaller than the inside diameter of part 4 of ring 3 and substantially equal to the inside diameter of joint 20. The variable diameter connection zone inside ring 7 is under the reference 21. Thus almost the total surface of the electrodes can be used.

All the body elements of the measuring device are mutually assembled with the help of eyelets and nuts and bolts 22 passing through the holes near the outer sides of the rings 2, 3, and 7. However, other types of known clamping devices may be used if they maintain firmly and align the various components of the measuring device.

In the peripheral portions of parts 5 and 8 of rings 3 and 7 respectively as well as in part 12 of guard ring 10, a hole 23 is drilled which simultaneously runs through them. In hole 23 a wire (not shown) is pulled through for connecting guard ring 10 to an appropriate potential, in general the earth or the ground of the electrical measuring device connected to the measuring device. This electrical connection wire can easily be soldered to the side of part 12 facing the plane of symmetry of the measuring device.

In order to electrically connect electrode 16, a hole 24 is drilled in part 4 of ring 3 near the inside surface of this part 4 as well as in part 8 of ring 7. The part of hole 24 going through ring 3 may be a simple groove in the inside surface of part 4, its depth being large enough to contain an electrical connection wire with a coat of insulation. This connection wire may be soldered or set into the electrode 16.

In order to electrically connect electrode 18, a hole 25 is drilled in part 8 of ring 7 as well as in joint 20 having the diameter of the electrical wire, this hole ending near the peripheral zone of electrode 18. The connection wire (not shown) of electrode 18 is soldered onto the electrode. However, the wire may also be set onto the electrode 18.

Figure 2:
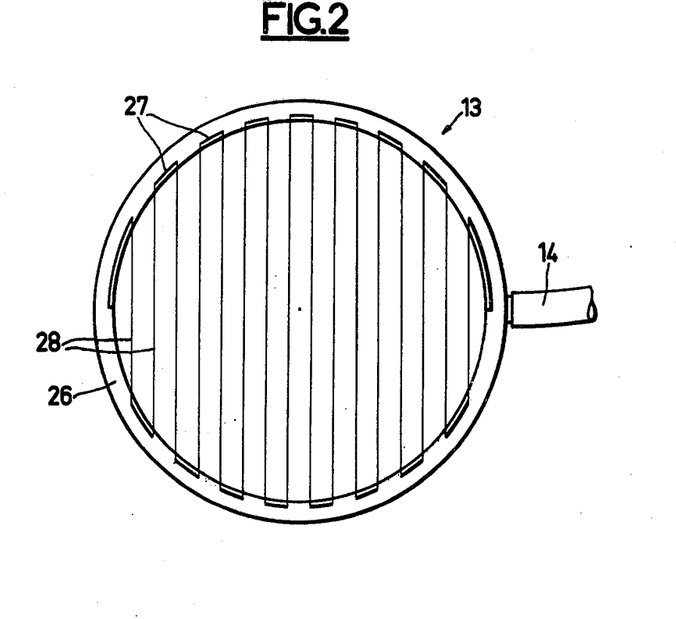
FIG. 2 is a view in elevation of the source electrode or first electrode of the device shown in FIG. 1.

FIG. 2 is a plan view of electrode 13 placed in the measuring device shown in FIG. 1. Electrode 13 comprises an annular support 26 made of electrically insulating material. Near the inside surface of each side of support 26, a series of bosses 27 are moulded integrally with support 26. The bosses 27 generally have the shape of slightly curved parallelepipeds depending on the curve of the said inside surface of support 26. These bosses 27 will be used to support the electrically conducting metallic wire 28 comprising the ionic source. The wire is placed in meanders from a point on one surface of support 26 to a point opposite on a line which is parallel to a line perpendicular to the longitudinal axis of the measuring device. At each end the wire 28 may be fastened in slits or notches (not shown) in these bosses. The lengths of these different bosses 27 taken peripherally go in decreasing order startng from the fixing point of wire 28 and going towards the middle along ring 26 of the said fixing points so that all the legs of the meanders formed by wire 28 be substantially parallel between each other and equidistant as shown on FIG. 2. The bosses 27 have a small enough thickness to ensure a certain flexibility and to stretch wire 28 which passes around the outside (radially) of these bosses and at a large enough distance from the corresponding side of support 26 so that the bosses ensure the necessary tension. Obviously, other shapes of bosses or notches may be used but a device stretching wire 28 on both ends must be used. On each side of ring 26 the same arrangement of bosses and wire meander must be used to ensure measuring device symmetry. The electric connection wire 14 is electrically connected to one of the ends of each meander of wire 28 by, for example, being fastened to the corresponding boss 27 of wire 28. However, in order to ensure a good mechanical fixation of wire 14 whose insulating layer is preferably thick, the inside diameter of sleeve 15,15 (FIG. 1) must be slightly smaller than the outside diameter of insulation of wire 14 in order to be tight during the assembly of the body 1 of the measuring device. Other fixing methods may be used for wire 14.

Metallic wire 28, which is stainless and non-corrodable, has a diameter between 10 and 100 microns, preferably about 20 microns. The pitch of the network formed by wire 28, that is, the distance separating two consecutive branches of a meander, should be between 1 and 10 millimeters, preferably about 5 millimeters.

Figure 6:
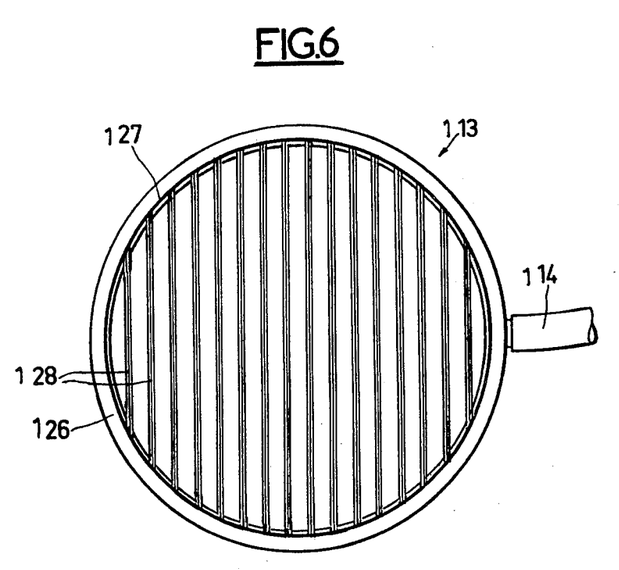
FIG. 6 is a plan view of an electrode comprising a support ring and a series of thin metallic blades.

However, electrode 13 can be made in another way, for example by fixing inside frame 26 a series of thin metallic blades arranged to be substantially equidistant and parallel to each other and to gaseous flow. The blade edges should have a small radius of curvature substantially like that of razor blades, said blades being electrically connected with each other.

Figure 3:
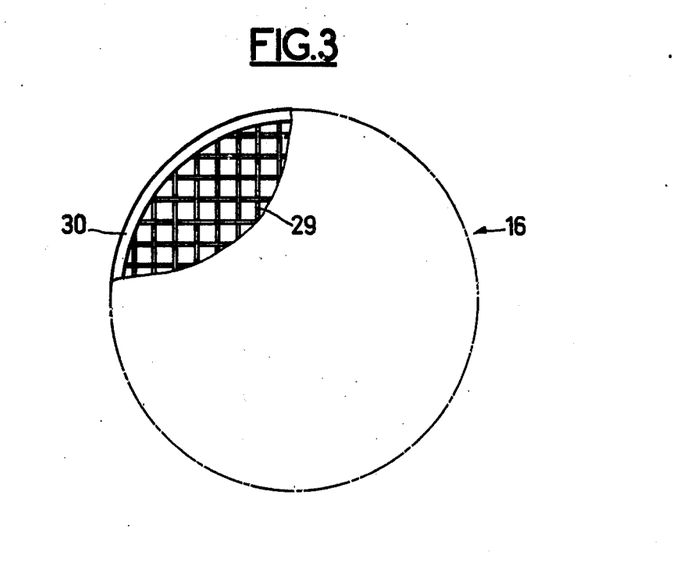
FIG. 3 is a partial view in elevation of the second electrode or "transparent" electrode of the device shown in FIG. 1.

"Transparent" electrode 16 represented in FIG. 3 is made entirely out of metal which is electrically conductive. This electrode 16 comprises a circular wire grid made in such a way that the mesh is substantially square. It is however, possible to have rhombic-shaped mesh or any other four-sided figure. Around the edges of the circular grid formed by wires 29 a metal ring 30 is set to maintain the ends of the different wires 29. The grid thus assembled is tinned and pressed so that each wire is soldered, thus increasing the mechanical rigidity of the grid. The radial thickness of ring 30 is a few millimeters wide in order to leave the largest possible surface free to the grid formed by wires 29 of electrode 16.

The pitch of the network formed by wires 29 of electrode 16 is between 1 and 10 millimeters, preferably 5 millimeters. The diameter of the wires comprising electrode 16 is between 0.5 mm. and 3 mm., preferably 1 to 1.5 mm. The distance separating wires 28 of electrode 13 from electrode 16 is about 100 times the diameter of wire 28. Thus, in the case of a wire 28 having a diameter of 20 microns, the distance is about 2 mm. This distance can be less than 2 mm. but there is a risk of dielectric breakdown between electrodes 13 and 16 requiring the voltage of power supply source of electrode 13 to be reduced. However, this reduction is limited by the minimum ionization potential of electrode 13 (in the order of 1,500 volts). Furthermore, the said distance should not be increased too much as the value of the high voltage supplying electrode 13 would have to be increased and sensitivity to polluting elements is also increased due to the fact that the distance covered by the ions between their source and the transparent and collecting electrode is also increased. At any rate, the distance separating the wires of electrode 13 from electrode 16 is between about 0.5 and 5 mm.

The third or collecting electrode generally comprises many axially extending channels the cross section of which is small with respect to their length, preferably in the order of some percents. The axial length of said channels must be sufficient for collecting all the ions having passed through the corresponding "transparent" electrode without being picked up by it, even when the gas flow speed has its maximum possible value. Moreover, the channel walls must be the thinnest possible in order to limit to the lowest possible value the pressure drop. This third electrode may be e.g. a honeycomb arrangement which is known.

Figure 4:
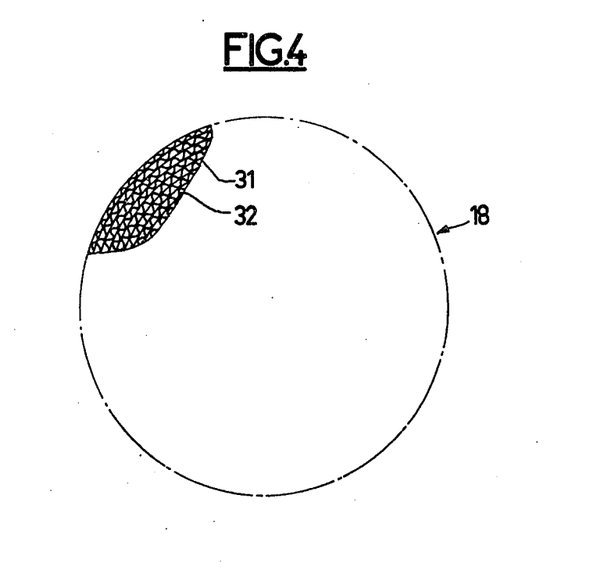
FIG. 4 is a partial view in elevation of the third electrode or collecting electrode of the device shown in FIG. 1.

In the preferred embodiment shown in FIGS. 1 and 4, the third electrode or collecting electrode 18 is realized in a known fashion, by placing a metallic thin sheet 31 against a corrugated metallic thin sheet 32 and by rolling both up. The two sheets 31 and 32 are electrically conductive and are of the same width. Thus assembled, the electrode is tinned and soldered so that each point of contact of sheets 31 and 32 is soldered on its entire length, thus making the electrode mechanically extremely rigid.

Due to the configuration of electrode 18, almost no pressure drop occurs across electrode 18 because of the thinness of sheets 31 and 32.

The pitch of the spiral formed by the coiling of sheets 31 and 32, that is, the distance between two successive layers of sheet 31 is between 0.5 and 3 millimeters, preferably 1 mm. The axial thickness of electrode 18 is between 5 and 30 mm, preferably about 15 mm.

The distance between electrodes 16 and 18, that is the thickness of ring 17, is preferably between 1 and 10 mm.

Figure 5:
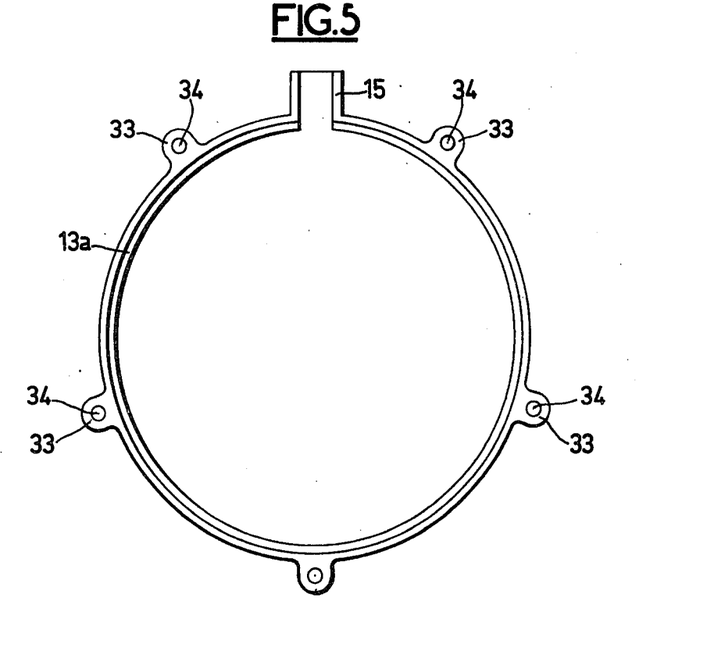
FIG. 5 is a view in elevation of an element of the tubular pipe of the device shown in FIG. 1.

On FIG. 5, ring 2 of the body 1 of the measuring device has been shown. On this FIG. 5, we clearly see half-shell 15 comprising the half of the sleeve through which passes the electrical connection conductor 14. Ring 2 carries on its outside surface five lugs 33 in which are formed holes 34 to fit bolts 22. Of course, the number of lugs 33 may be different. Lugs 33 may even be replaced by simple grooves into which are placed bolts 22.

Due to the fact that the body of the measuring device of the present invention is made by fitting the ring carrying the transparent and collecting electrodes into the ring carrying the source electrode, which is brought to a high potential with respect to the first two above-mentioned electrodes, with the interposition of a guard ring, it can be seen that no surface current can circulate along the inner or the outer surface of the measuring device body since said guard ring prevents all contact between the ring supporting the source electrode and the ring supporting the "transparent" and collecting electrodes, and inevitably interrupts the path which any such surface current could take.

Furthermore, it is very easy to assemble the measuring device in conformity with the present invention: first, the source electrode is inserted between the two rings 2, then at the end of the two rings 2 are inserted the two rings 3 into which electrode 16, insulating ring 17, electrode 18, have been inserted with their connection wires; ring 3 receives guard ring 10, after which rings 9 are put into place with the interposition of joints 20 while passing through holes 24 and 25 the electrical connection wires of electrodes 16 and 18. The assembly is finally screwed together by bolts 22. Thus, there is no difficulty in positioning the electrodes inside the device body who's assembly can be done very quickly.

Furthermore, it has been noticed that rough cast rings may be used to form the body 1 of the measuring device without harming the electrical qualities of the device. Consequently, the device of the present invention can be produced in large numbers at relatively low cost.

The measuring device of the present invention may also be assembled asymmetrically, but in this case, the source electrode must be downstream from at least another electrode 16 which shall be electrically connected to the other electrode 16 outside the device body, in order to avoid measuring errors due to ions emitted by the source electrode in the opposite direction from the gaseous flow to be measured, especially when flow occurs at very low speed. In this case, there is need of a ring enabling electrode 16 to be fastened without electrode 18. Instead of electrode 16, an electrode 18 may also be placed upstream from the source electrode, but the electrode 18 must be electrically connected to electrode 16 found downstream from source electrode. This assembly is particularly advantageous when slow flow speeds are to be measured and for which a large number of ions are emitted into the counter-current, as an electrode 16 placed alone upstream may not collect all these ions due to its small thickness. However, for standardization reasons, even in the asymmetrical version, two electrodes 16 and two electrodes 18 could be placed each time in the body 1 of the device as these electrodes can be manufactured at a low cost.

When the gas to be measured contains much humidity, water particles may condense on the inner surfaces of the measuring device body, even when the latter is made of hydrophobic material. It is therefore important that the electrodes 16 and 18 and the guard ring 10 be made of the same metal in view to preclude any electrolytic phenomenon that could occur between these metallic components.

As said hereabove, the length of part 11 of guard ring 10 is slightly shorter than the length of part 4 of ring 3. In addition to the fact that the inner surface current path is thus increased between rings 2 and 3, the gap thus defined between the electrode 13, front face of part 11 of guard ring 10 and part 6 of ring 3 allows the corresponding counter flow (i.e. flowing from third electrode towards first electrode) to produce a depression therein and to prevent soiling of the area adjoining the front surface of part 11 of guard ring 10, thus improving the elimination of the inner surface current.

In order to facilitate the manufacturing of the first electrode, especially for the symmetric configuration, this electrode could be manufactured in a way slightly different from that shown in the drawing: the support ring 26 could be moulded without bosses 27, but with peripheral notches, successive portions of a single wire 28 being alternatively arranged on each front face of said ring 26, said wire being guided by said notches, in order to obtain on each front face of said support ring a network of substantially parallel wire sections.

The inner cross section the body of present measuring device, or the useful section of its electrodes may have a diameter comprised in the range from some millimeters up to some tens of centimeters, preferably in the range from 5 to 20 centimeters.

I claim:

1. An ionic measuring device for measurement of mass flow or speed of gaseous flow comprising:
   (a) a first annular insulating member which supports a conductive ionic source electrode;
   (b) a second annular insulating member spaced from said electrode in the flow direction, said second member supporting "transparent" and collecting conductive electrodes insulated from each other and from said source electrode, said "transparent" electrode being located between said source electrode and said collecting electrode; and
   (c) a grounded conducting annular member located between said first and second insulating members and contiguous thereto for eliminating surface currents between said first and second insulating members.

2. The ionic measuring device according to claim 1 wherein:
   (a) said second insulating member comprises a radially extending portion and an axially extending portion, the outside diameter of said axially extending portion being slightly smaller than the inside diameter of said first member, said axially extending portion extending within said first member; and
   (b) said conducting member comprises a radially extending portion and an axially extending portion, the outside diameter of said axially extending portion being substantially equal to the inside diameter of said first member and the inside diameter of said axially extending portion being substantially equal to the outside diameter of the axially extending portion of said second member, the axially extending portion of said conducting member being located between the outer wall of the axially extending portion of said second member and the inner wall of said first member, the radially extending portion of said conducting member being located between the radially extending portion of said second member and the end wall of said first member.

3. The ionic measuring device according to claim 2 wherein:
   (a) said second member includes stop means for receiving said "transparent" and collecting electrodes, said stop means facing said source electrode; and
   (b) said first member includes stop means for receiving said source electrode so as to define a gap between said source electrode and said second member.

4. The ionic measuring device according to claim 2 wherein the length of the axially extending portion of said conductive member is less than the length of the axially extending portion of said second member, thereby forming a gap between the source electrode and the end of the axially extending portion of said conducting member which extends within said first member so as to prevent soiling of the area adjoining said end of said conducting member.

5. The ionic measuring device according to claim 1 wherein said ionic source electrode comprises a support ring made of insulating material to which is attached at least one conducting wire network in the form of a parallel wire array.

6. The ionic measuring device according to claim 5 wherein said support ring comprises, on the face opposite said "transparent" electrode, near its inner surface, a series of bosses moulded integrally with said support ring, said bosses having the shape of slightly curved parallelepipeds conforming generally to the curvature of said inner surface, said conducting wire network comprising a metallic wire arranged in meander between said bosses, the legs of said meander being substantially parallel to and equidistant from each other.

7. The ionic measuring device according to claim 5 wherein the pitch of said network is between about 1 and 10 millimeters and wherein the diameter of said wire is between about 10 and 100 microns.

8. The ionic measuring device according to claim 5 wherein the pitch of said network is approximately 5 millimeters and wherein the diameter of said wire is about 20 microns.

9. The ionic measuring device according to claim 5 wherein the distance between the wire network of said source electrode and said "transparent" electrode is approximately 100 times the diameter of said source electrode wire.

10. The ionic measuring device according to claim 5 wherein the distance between said source electrode and said "transparent" electrode is between about 0.5 and 5 millimeters.

11. The ionic measuring device according to claim 5 wherein the distance between said source electrode and said "transparent" electrode is about 2 millimeters.

12. The ionic measuring device according to claim 1 wherein said source electrode comprises a support ring made of electrically insulating material, a series of thin metallic blades arranged substantially equidistant from and parallel to each other and to gaseous flow inside said support ring, the edges of said blades having a small radius of curvature, said blades being electrically connected to each other.

13. The ionic measuring device according to claim 1 wherein said "transparent" electrode comprises a circular grid of electrically conductive wire.

14. The ionic measuring device according to claim 13 wherein the pitch of said grid is between about 1 and 10 millimeters and wherein the diameter of said wire is between about 0.5 and 3 millimeters.

15. The ionic measuring device of claim 13 wherein the pitch of said grid is about 5 millimeters and the diameter of said wire is between about 1 and 1.5 millimeters.

16. The ionic measuring device according to claim 1 wherein the thickness of said collecting electrode in the axial direction is greater than the thickness of said "transparent" electrode in the axial direction.

17. The ionic measuring device according to claim 16 wherein said collecting electrode comprises axially extending channels, the cross section of which is a small percentage of their length, said length being sufficient for collecting all of the ions having passed through said "transparent" electrode without having been picked up by said "transparent" electrode.

18. The ionic measuring device according to claim 17 wherein the walls of said channels are made of thin, electrically conductive material so as to minimize the pressure drop across said collecting electrode.

19. The ionic measuring device according to claim 18 wherein said collecting electrode comprises a spiral conductive array formed from a flat, thin conductive sheet and a corrugated, thin conductive sheet which have been rolled up together to a diameter substantially equal to the inner diameter of said second member.

20. The ionic measuring device according to claim 19 wherein the radial distance between successive layers of said flat, conductive sheet is between about 0.5 and 3 millimeters and wherein the thickness of said collecting electrode in the axial direction is between about 5 and 30 millimeters.

21. The ionic measuring device according to claim 19 wherein the radial distance between successive layers of said flat, conductive sheet is about 1 millimeter and wherein the thickness of said collecting electrode in the axial direction is about 15 millimeters.

22. The ionic measuring device according to claim 1 wherein the distance between said "transparent" electrode and said collecting electrode is between about 1 and 10 millimeters.

23. The ionic measuring device according to claim 1 further comprising:
   (a) a third insulating annular member connected to the free front face of said first member; and
   (b) a fourth insulating annular member connected to the free front face of said second member; said third and fourth members forming suitable means for connecting said measuring device to gas ducts.

24. A bidirectional measuring device for measurement of mass flow or speed of gaseous flow comprising:
   (a) a first annular insulating member which supports a conductive ionic source electrode;
   (b) second and third annular insulating members disposed symmetrically with respect to said first insulating member, said first, second and third insulating members being located along the flow of said gas, said second and third insulating members each supporting "transparent" and collecting electrodes insulated from each other and from said source electrode and located substantially perpendicular to said flow, each "transparent" electrode being located between said source electrode and its corresponding collecting electrode; and
   (c) first and second grounded conducting annular members located, respectively, between said first and second and between said first and third insulating members and contiguous, respectively, thereto for eliminating surface currents, respectively, between said first and second and between said first and third insulating members.

25. The ionic measuring device according to claim 24 wherein:
   (a) at least one of said second and third insulating members comprises a radially extending portion and an axially extending portion, the outside diameter of said axially extending portion being slightly smaller than the inside diameter of said first insulating member, said axially extending portion extending within said first insulating member; and
   (b) the corresponding conductive member comprises a radially extending portion and an axially extending portion, the outside diameter of said axially extending portion being substantially equal to the inside diameter of said first insulating member and the inside diameter of said axially extending portion being substantially equal to the outside diameter of the axially extending portion of said at least one of said second and third insulating members, the axially extending portion of said corresponding conducting member being located between the outer wall of the axially extending portion of said at least one of said second and third insulating members and the inner wall of said first insulating member, the radially extending portion of said corresponding conducting member being located between the end wall of said first insulating member and the radially extending portion of said at least one of said second and third insulating members.

26. The ionic measuring device according to claim 25 wherein:
(a) at least one of said second and third insulating members including stop means for receiving said "transparent" and collecting electrodes, said stop means facing said source electrode; and
(b) said first insulating member includes stop means for receiving said source electrode so as to define a gap between said source electrode and said at least one of said second and third insulating members.

27. The ionic measuring device according to claim 25 wherein the length of the axially extending portion of said corresponding conductive member is less than the length of the axially extending portion of said at least one of said second and third insulating members, thereby forming a gap between the source electrode and the end of the axially extending portion of said corresponding conducting member which extends within said first insulating member so as to prevent soiling of the area adjoining said end of said corresponding conductive member.

28. The ionic measuring device according to claim 24 wherein said ionic source electrode comprises a support ring made of insulating material to which is attached at least one conducting wire network in the form of a parallel wire array.

29. The ionic measuring device according to claim 28 wherein said support ring comprises, on one face, near its inner surface, a series of bosses moulded integrally with said support ring, said bosses having the shape of slightly curved parallelepipeds conforming generally to the curvature of said inner surface, said conducting wire network comprising a metallic wire arranged in meander between said bosses, the legs of said meander being substantially parallel to and equidistant from each other.

30. The ionic measuring device according to claim 28 wherein the pitch of said network is between about 1 to 10 millimeters and wherein the diameter of said wire is between about 10 and 100 microns.

31. The ionic measuring device according to claim 28 wherein the pitch of said network is about 5 millimeters and wherein the diameter of said wire is about 20 microns.

32. The ionic measuring device according to claim 28 wherein, the distance between the wire network of said source electrode and at least one "transparent" electrode is approximately 100 times the diameter of said source electrode wire.

33. The ionic measuring device according to claim 28 wherein the distance between said source electrode and at least one "transparent" electrode is between about 0.5 and 5 millimeters.

34. The ionic measuring device according to claim 28 wherein the distance between said source electrode and at least one "transparent" electrode is about 2 millimeters.

35. The ionic measuring device according to claim 24 wherein said source electrode comprises a support ring made of electrically insulating material, a series of thin metallic blades arranged substantially equidistant from and parallel to each other and to gaseous flow inside said support ring, the edges of said blades having a small radius of curvature, said blades being electrically connected to each other.

36. The ionic measuring device according to claim 24 wherein at least one of said "transparent" electrodes comprises a circular grid of electrically conductive wire.

37. The ionic measuring device according to claim 36 wherein the pitch of said grid is between about 1 and 10 millimeters and wherein the diameter of said wire is between about 0.5 and 3 millimeters.

38. The ionic measuring device according to claim 36 wherein the pitch of said grid is about 5 millimeters and wherein the diameter of said wire is between about 1 and 1.5 millimeters.

39. The ionic measuring device according to claim 24 wherein the collecting electrode of at least one of said second and third insulating members has a thickness in the axial direction which is greater than the thickness in the axial direction of at least one of said "transparent" electrodes.

40. The ionic measuring device according to claim 39 wherein at least one of said collecting electrodes comprises axially extending channels, the cross section of which is a small percentage of their length, said length being sufficient for collecting all of the ions having passed through the corresponding "transparent" electrode without having been picked up by said corresponding "transparent" electrode.

41. The ionic measuring device according to claim 40 wherein the walls of said channels are made of thin, electrically conducting material so as to minimize the pressure drop across said collecting electrode.

42. The ionic measuring device according to claim 41 wherein said collecting electrode comprises a spiral conductive array formed from a flat, thin conductive sheet and a corrugated, thin conductive sheet which have been rolled up together to a diameter substantially equal to the inner diameter of said at least one of said second and third insulating members.

43. The ionic measuring device according to claim 42 wherein the radial distance between successive layers of said flat, conductive sheet is between about 0.5 and 3 millimeters and wherein the thickness of said collecting electrode in the axial direction is between about 5 and 30 millimeters.

44. The ionic measuring device according to claim 42 wherein the radial distance between successive layers of said flat, conductive sheet is about 1 millimeter and wherein the thickness of said collecting electrode in the axial direction is about 15 millimeters.

45. The ionic measuring device according to claim 1 wherein the distance between at least one "transparent" electrode and the corresponding collecting electrode is between about 1 and 10 millimeters.

46. The ionic measuring device according to claim 24 further comprising:

(a) a fourth insulating annular member connected to the free front face of said second insulating member; and (b) a fifth insulating annular member connected to the free front face of said third insulating member, said fourth and fifth members forming suitable means for connecting said measuring device to gas ducts.

47. A bidirectional measuring device for measurment of mass flow or speed of gaseous flow, comprising:

a first annular insulating member which supports a conductive ionic source electrode, said source electrode comprising a support ring made of insulating material to which are attached two conducting wire networks in the form of parallel wire arrays, said two networks being electrically connected to one another and symmetrical with respect to a plane perpendicular to the axis of said measuring device and passing through the center of said support ring, said support ring comprising, on each of its front faces, near its inner surface, a series of bosses moulded integrally with said support ring, said bosses having the shape of slightly curved parallelepipeds conforming generally to the curvature of said inner surface, said conducting wire nerworks each comprising a metallic wire arranged in meander between said bosses, the legs of each meander being substantially parallel to and equidistant from each other;

second and third insulating members disposed symmetrically with respect to said first insulating member, said first, second and third insulating members being located along the flow of said gas, said second and third insulating members each supporting "transparent" and collecting electrodes insulated from each other and from said source electrode and located substantially perpendicular to said flow, each "transparent" electrode being located between said source electrode and the corresponding collecting electrode, said "transparent" electrodes each comprising a circular grid of electrically conductive wire, said collecting electrodes each comprising a spiral conductive array formed from a flat, thin conductive sheet and a corrugated, thin conductive sheet which have been rolled up together to a diameter substantially equal to the inner diameter of said second and third insulating members, said second and third insulating members each comprising stop means for receiving said "transparent" and collecting electrodes, said stop means facing said source electrode, said first insulating member comprising stop means for receiving said source electrode so as to define gaps between said source electrode and said second and third insulating members, said second and third insulating members each comprising a radially extending portion and an axially extending portion, the outside diameter of said axially extending portion being slightly smaller than the inside diameter of said first insulating member, said axially extending portion extending within said first insulating member, first and second grounded conducting annular members located, respectively, between said first and second and between said first and third insulating members and contiguous, respectively, between said first and second and between said first and third insulating members, said conducting members each comprising a radially extending portion and an axially extending portion, the outside diameter of said axially extending portion being substantially equal to the inside diameter of said first insulating member and the inside diameter of said axially extending portion being substantially equal to the outside diameter of the axially extending portion of said second and third insulating members, the axially extending portions of the conducting members being located between the outer walls of the axially extending portions of said second and third insulating members and the inner wall of said flat insulating member, the radially extending portions of said conducting members being located between the end walls of said first insulating member and the radially extending portions of said second and third insulating members, the length of the axially extending portions of said conducting members being less than the length of the axially extending portions of second and third insulating members, thereby forming gaps between the source electrode and the ends of the axially extending portions of said conducting members which extend within said first insulating member so as to prevent soiling of the areas adjoining said ends of said conductive members;

fourth and fifth insulating annular members connected, respectively, to the free front faces of said second and third insulating members, said fourth and fifth members forming suitable means for connecting said measuring device to gas ducts.

* * * * *